E. J. LUCEY.
FIFTH WHEELS.

No. 180,772. Patented Aug. 8, 1876.

Witnesses:
Henry Eichling
R. S. Clark

Inventor:
Edward J. Lucey
By Fitch & Fitch
His Attys.

UNITED STATES PATENT OFFICE.

EDWARD J. LUCEY, OF BOONE, IOWA.

IMPROVEMENT IN FIFTH-WHEELS.

Specification forming part of Letters Patent No. 180,772, dated August 8, 1876; application filed February 14, 1876.

*To all whom it may concern:*

Be it known that I, EDWARD J. LUCEY, of Boone, Boone county, State of Iowa, have invented an Improved Fifth-Wheel for Vehicles, of which the following is a full, clear, and exact description, reference being had to the accompanying drawing, forming part hereof.

My invention consists in a collar carrying radiating arms and forming a spider, on the ends of which arms are arranged friction-rollers, the said collar being given a bearing about the socket-joint of the lower and upper wheels, so that the collar and arms may revolve, and the arms extending from the collar, so that the rollers are interposed between the perimeters of the said wheels. The friction between the upper and lower faces of a fifth-wheel is greatly lessened by a strong and durable device, as hereinafter particular set forth.

Figure 1:
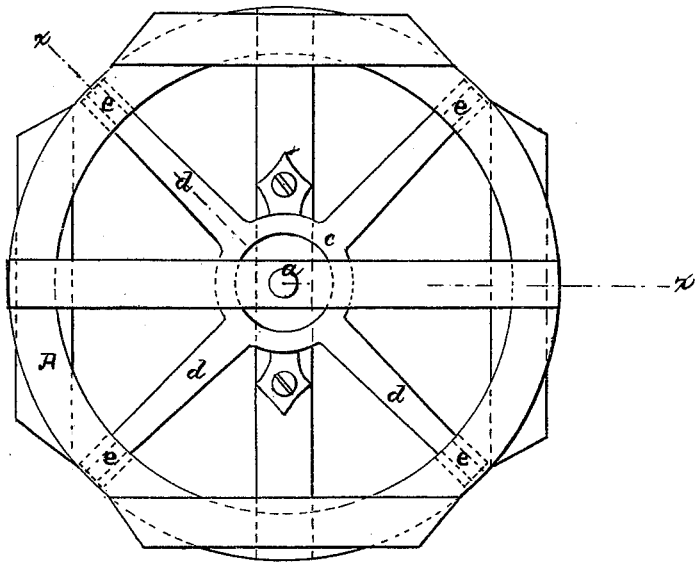
Figure 2:
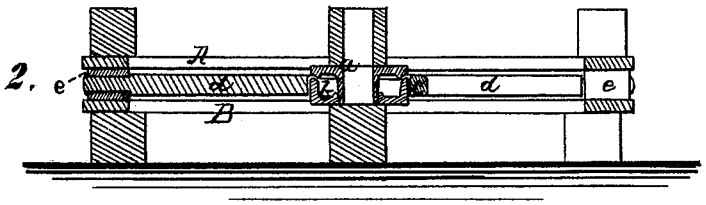
Figure 3:
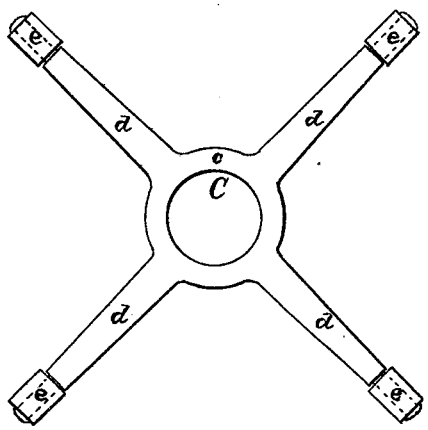

Figure 1 is a plan of a fifth-wheel embodying my invention. Fig. 2 is a cross-section on the line $x\ x$, Fig. 1; and Fig. 3 is a plan, in detail, of my improved spider carrying the friction-rollers.

A and B are, respectively, the upper and lower wheels or rings of the fifth-wheel. The lower wheel B has the central socket $b$ circular in form, into which is adjusted the flanged pivot $a$, fixed on the upper wheel A. The pivot $a$ has a longitudinal opening through it for the reception of the bolt which passes through the bottom of the socket. This constitutes a simple and well-known socket or pivot joint for the upper and lower wheels A and B. C is my improved spider, which is formed with the collar $c$, that is adjusted closely about the socket $b$, and has a bearing about the same, on which it may revolve, and the said collar has the radiating arms $d$, which extend out from it and reach to between the perimeters of the wheels A and B. Upon the ends of these arms $d$ are arranged the friction-rollers $e$, which are interposed between the perimeters of the wheels A and B, as shown. This spider, composed of the collar $c$ and arms $d$, is preferably cast or wrought in one piece of metal, and the rollers are thereafter added to the ends of the arms. Any desired number of arms may be employed, arranged similarly to those herein shown.

I am aware that friction-rollers have been heretofore employed between the perimeters of the upper and lower wheels of a fifth-wheel. They have been arranged in notches or slots formed in either or both of the wheels, or with bearings in lugs fixed or cast upon either or both. I therefore do not claim, broadly, friction-rollers interposed between the upper and lower wheels of a fifth-wheel, or either of the specific devices for arranging the same above recited. Nor do I claim conical or beveled rollers, as I am aware that such have been heretofore used. I intend to limit my claim hereunder to the specific devices shown and described herein, for, when the rollers are set in notches or slots in either or both of the said upper or lower wheels, the said wheels are consequently greatly weakened at the points where the notches or slots are formed, and when the rollers are set in lugs fixed or cast on the wheels the said lugs are very apt to be broken off, and the roller thus dislodged; but in my device, as shown, a free movement of the rollers themselves, permitting them to revolve with the perimeters of the wheels by the rotation of the arms carrying them, decreases the strain, while, the rollers being on the ends of the arms and independent of the wheels, a leverage is secured which resists sudden jars, and, decreasing the liability to breakage, renders my device more durable and satisfactory.

What I claim as my invention, and desire to secure by Letters Patent, is—

In a fifth-wheel for vehicles, the combination of the spider C, having the collar $c$, radiating arms $d$, and their friction-rollers $e$, with the upper and lower wheels A B, when constructed and arranged to operate as described, and for the purpose specified.

EDWARD J. LUCEY.

Witnesses:
JOHN C. HALL,
J. H. COLLIER.